US012722290B2

(12) United States Patent
Zhou et al.

(10) Patent No.: US 12,722,290 B2
(45) Date of Patent: Sep. 1, 2026

(54) CROSS-DOMAIN IMITATION LEARNING USING GOAL CONDITIONED POLICIES

(71) Applicant: GDM Holding LLC, Mountain View, CA (US)

(72) Inventors: Yuxiang Zhou, London (GB); Yusuf Aytar, London (GB); Konstantinos Bousmalis, London (GB)

(73) Assignee: GDM Holding LLC, Mountain View, CA (US)

( * ) Notice: Subject to any disclaimer, the term of this patent is extended or adjusted under 35 U.S.C. 154(b) by 581 days.

(21) Appl. No.: 18/028,966

(22) PCT Filed: Oct. 1, 2021

(86) PCT No.: PCT/EP2021/077165
§ 371 (c)(1),
(2) Date: Mar. 28, 2023

(87) PCT Pub. No.: WO2022/069732
PCT Pub. Date: Apr. 7, 2022

(65) Prior Publication Data

US 2023/0330846 A1 Oct. 19, 2023

(30) Foreign Application Priority Data

Oct. 1, 2020 (GR) .............................. 20200100596

(51) Int. Cl.
*B25J 9/16* (2006.01)

(52) U.S. Cl.
CPC .................................... *B25J 9/163* (2013.01)

(58) Field of Classification Search
CPC ........... B25J 9/163; G05B 2219/40116; G05B 2219/40391; G06N 3/045; G06N 3/0464; G06N 3/084; G06N 3/088; G06N 3/0895; G06N 3/092; G06N 3/008
See application file for complete search history.

(56) References Cited

U.S. PATENT DOCUMENTS

2020/0276703 A1* 9/2020 Chebotar ............... G06N 3/045

OTHER PUBLICATIONS

Abdolmaleki et al., "Maximum a posteriori policy optimization," CoRR, Jun. 14, 2018, arXiv:1806.06920, 23 pages.
Aytar et al., "Playing hard exploration games by watching youtube," Advances in Neural Information Processing Systems 31, 2018, pp. 2930-2941.
Bain et al., "A framework for behavioral cloning," Machine Intelligence 15, Jul. 16, 1995, pp. 103-129.
Bonardi et al., "Learning one-shot imitation from humans without humans," IEEE Robotics and Automation Letters, Apr. 2020, 5(2):3533-3539.

(Continued)

*Primary Examiner* — Pei Yong Weng
(74) *Attorney, Agent, or Firm* — Fish & Richardson P.C.

(57) ABSTRACT

It is described a system implemented as computer programs on one or more computers in one or more locations that trains a policy neural network that is used to control a robot, i.e., to select actions to be performed by the robot while the robot is interacting with an environment, through imitation learning in order to cause the robot to perform particular tasks in the environment.

20 Claims, 4 Drawing Sheets

(56) References Cited

OTHER PUBLICATIONS

Finn et al., "Guided cost learning: Deep inverse optimal control via policy optimization," Proceedings of The 33rd International Conference on Machine Learning, 2016, 48:49-58.
Ho et al., "Generative adversarial imitation learning," Advances in neural information processing systems 29, 2016, pp. 4565-4573.
International Preliminary Report on Patentability in International Appln. No. PCT/EP2021/077165, Mar. 28, 2023, 11 pages.
International Search Report and Written Opinion in International Appln. No. PCT/EP2021/077165, Jan. 28, 2022, 18 pages.
Jeong et al., "Self-supervised sim-to-real adaptation for visual robotic manipulation," CoRR, May 31, 2020, arXiv:1910.09470, 7 pages.
Kaelbling, "Learning to achieve goals," IJCAI, Aug. 28, 1993, pp. 1094-1099.
Mandlekar et al., "Learning to generalize across long-horizon tasks from human demonstrations," CoRR, Mar. 13, 2020, arXiv:2003.06085, 11 pages.
Nasiriany et al., "Planning with goal-conditioned policies," Advances in Neural Information Processing Systems 32, 2019, pp. 14843-14854.
Ng et al., "Algorithms for inverse reinforcement learning," INLCML, Jun. 29, 2000, 1:2.
Oord et al., "Representation learning with contrastive predictive coding," CoRR, Jul. 10, 2018, arXiv:1807.03748, 13 pages.
Pathak et al., "Zero-Shot Visual Imitation," 2018 IEEE/CVF Conference on Computer Vision and Pattern Recognition Workshops, Jun. 18, 2018, pp. 2131-2134.
Peng et al., "DeepMimic: Example-guided deep reinforcement learning of physics-based character skills," ACM Transactions on Graphics (TOG), Jul. 30, 2018, 37(4):1-14.
Peng et al., "Learning agile robotic locomotion skills by imitating animals," CoRR, Apr. 2, 2020, arXiv:2004.00784, 14 pages.
Peng et al., "SFV: Reinforcement learning of physical skills from videos," ACM Transactions on Graphics (TOG), Dec. 4, 2018, 37(6):1-14.
Riedmiller et al., "Learning by playing-solving sparse reward tasks from scratch," CoRR, Feb. 28, 2018, arXiv:1802.10567, 18 pages.
Robotsguide.com [online], "Jaco," 2009, retrieved on Nov. 28, 2023, retrieved from URL<https://robotsguide.com/robots/jaco/>, 13 pages.
Ross et al., "A reduction of imitation learning and structured prediction to no-regret online learning," Proceedings of the Fourteenth International Conference on Artificial Intelligence and Statistics, 2011, 15:627-635.
Russell, "Learning agents for uncertain environments (extended abstract)," Proceedings of the eleventh annual conference on Computational learning theory, Jul. 24, 1998, pp. 101-103.
Sermanet et al., "Time-contrastive networks: Self-supervised learning from video," 2018 IEEE International Conference on Robotics and Automation (ICRA), May 21-25, 2018, pp. 1134-1141.
Shadowrobot.com [online], "Dexterous Hand Series," Nov. 2020, retrieved on Nov. 28, 2023, retrieved from URL<https://www.shadowrobot.com/dexterous-hand-series/>, 7 pages.
Stadie et al., "Third-person imitation learning," CoRR, Mar. 6, 2017, arXiv:1703.01703, 16 pages.
Todorov et al., "Mujoco: A physics engine for model-based control," 2012 IEEE/RSJ International Conference on Intelligent Robots and Systems, Oct. 7-12, 2012, pp. 5026-5033.
Yu et al., "One-shot imitation from observing humans via domain-adaptive meta-learning," CoRR, Feb. 5, 2018, arXiv:1802.01557, 12 pages.

* cited by examiner

CROSS-DOMAIN IMITATION LEARNING USING GOAL CONDITIONED POLICIES

CROSS-REFERENCE TO RELATED APPLICATIONS

This application is a National Stage Application under 35 U.S.C. § 371 and claims the benefit of International Application No. PCT/EP2021/077165, filed Oct. 1, 2021, which claims priority to Greece National patent application No. 20200100596, filed on Oct. 1, 2020. The disclosure of the prior application is considered part of and is incorporated by reference in the disclosure of this application.

BACKGROUND

This specification relates to controlling robots using neural networks.

Neural networks are machine learning models that employ one or more layers of nonlinear units to predict an output for a received input. Some neural networks include one or more hidden layers in addition to an output layer. The output of each hidden layer is used as input to or more other layers in the network, i.e., one or more other hidden layers, the output layer, or both. Each layer of the network generates an output from a received input in accordance with current values of a respective set of parameters.

SUMMARY

This specification describes a system implemented as computer programs on one or more computers in one or more locations that trains a policy neural network that is used to control a robot, i.e., to select actions to be performed by the robot while the robot is interacting with an environment, through imitation learning in order to cause the robot to perform particular tasks in the environment.

Particular embodiments of the subject matter described in this specification can be implemented so as to realize one or more of the following advantages.

Imitation with Reinforcement Learning (RL) has shown potential for tasks where the reward definition is unclear, i.e., where no specified reward signal exists for indicating a robot's progress towards completing a task. However, while existing third-person imitation methods can handle simpler tasks, e.g., reaching and lifting, these existing techniques perform poorly on more complex tasks like those that are likely to be required in industrial or other commercial settings, e.g., tasks that require contact-rich longer sequences of object interactions in order to be performed successfully. One example of such a contact-rich longer task is a task that requires stacking or otherwise jointly manipulating multiple objects in the environment. The described techniques, on the other hand, can allow the policy neural network to be trained to successfully perform third-party imitation even for such complex tasks, e.g., to successfully follow complex trajectories with rich contact dynamics and longer sequences. That is, after being trained using the described techniques, the policy neural network can be used to control the robot to effectively cause the environment reach a goal state even when (i) reaching the goal state requires complex interactions with objects in the environment and (ii) the demonstrations available for training the policy neural network are observations that are captured from a third-person view of the demonstration agent (such as observations captured from one or more sensor(s) which are not mounted on the robot) while observations characterizing current states of the environment after training are from a first-person, ego-centric view of the environment (that is, observations captured from the perspective of the robot, such as by one or more sensors mounted on the robot and/or moving with the robot).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that trains a policy neural network that is used to control a robot, i.e., to select actions to be performed by the robot while the robot is interacting with an environment in response to observations that characterize states of the environment. The robot typically moves (e.g. navigates and/or changes its configuration) within the environment.

The observations may include, e.g., one or more of: images (such as ones captured by a camera and/or Lidar sensor), object position data, and other sensor data from sensors that capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In other words, the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

The actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment.

Figure 1:
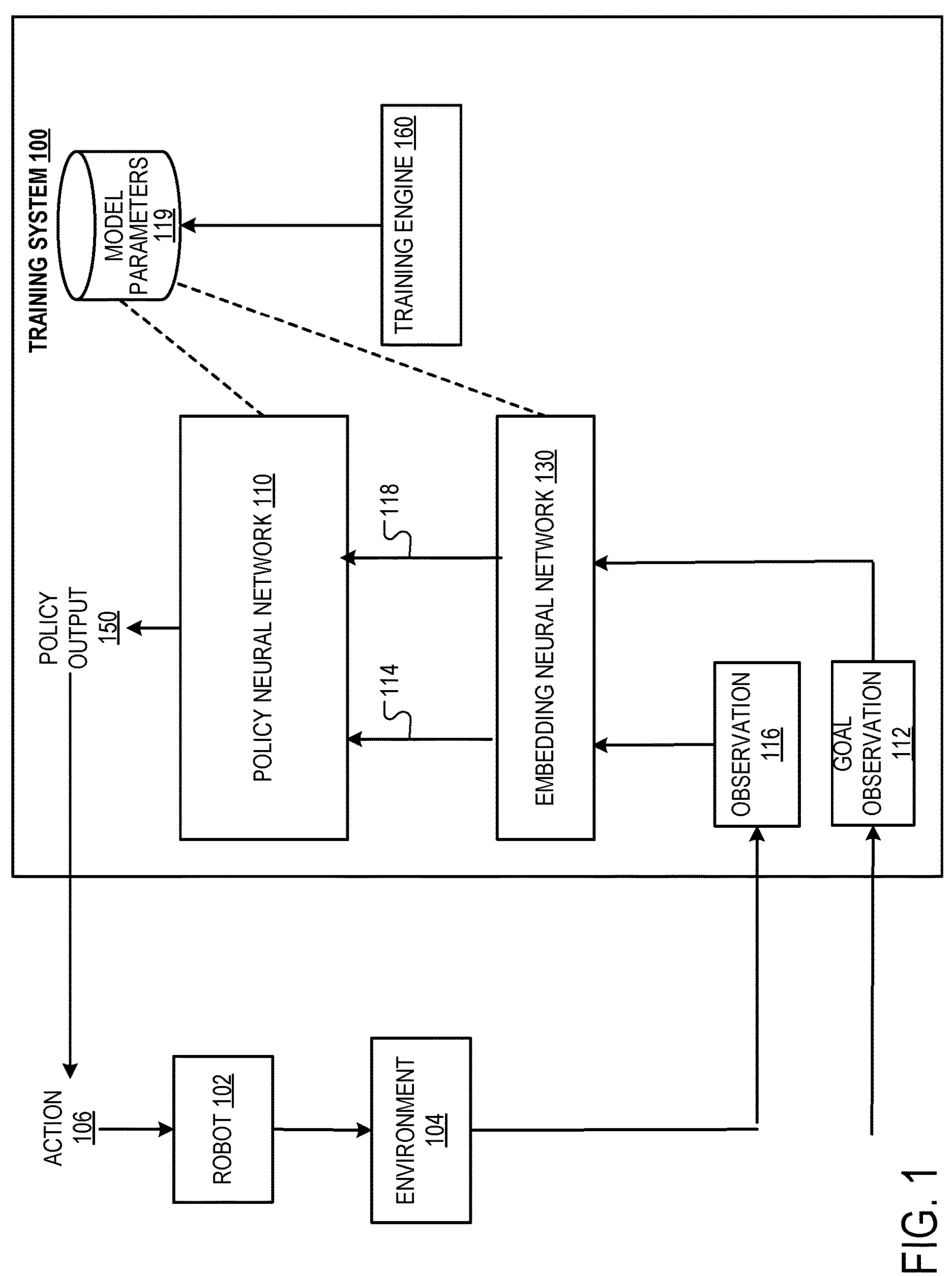
FIG. 1 shows an example neural network training system.

FIG. 1 shows an example neural network training system 100. The neural network training system 100 is an example of a system implemented as computer programs on one or more computers in one or more locations, in which the systems, components, and techniques described below can be implemented.

The neural network training system 100 trains a policy neural network 110 that is used to control a robot 102, i.e., to select actions 106 to be performed by the robot 102 while the robot 102 is interacting with an environment 104, through imitation learning in order to cause the robot 102 to perform particular tasks in the environment 104.

The policy neural network 110 is a neural network that is configured to receive a policy input and to process the policy input to generate a policy output 150 that defines an action to be performed by the robot 102.

Generally, the task to be performed by the robot 102 at any given time is specified by a goal observation 112 that characterizes a goal state of the environment 106, i.e., that characterizes the state that the environment should reach in order for the task to be successfully completed.

For example, the goal observation 112 can be or can include an image of the environment 104 when the environment 104 is in the goal state.

For example, the tasks can include causing the robot 102 to navigate to different locations in the environment 104 (in which case the goal observations can be images of different locations in the environment), causing the robot to locate different objects (in which case the goal observations can be images of different objects that the robot should locate in the environment), causing the robot to pick up different objects or to move different objects to one or more specified locations (in which case the goal observations can be images of objects in particular positions in the environment), and so on.

In particular, to select the action 106 to be performed by the robot 102 at any given time step, the system 100 receives a current observation 116 characterizing the current state that the environment 104 is in at the given time step. The observations 116 may be captured by image generation unit(s) (e.g. cameras and/or Lidar sensors) or other types of sensor.

In some cases, the current observation 116 is from a different perspective than the goal observation 112. For example, the current observation 116 can be one or more first-person, ego-centric images of the environment, that is images captured by one or more cameras (or other image generation unit(s)) of the robot. The cameras may be mounted on the robot so as to move with the robot as the robot navigates in the environment. The goal observation 112 can be one or more third-person images of an agent, e.g., the robot or a demonstration agent, when the environment is in the goal state.

The system 100 generates an embedding 114 of the current observation 116 and an embedding 118 of the goal observation 112. Embeddings, as used in this specification, are ordered collections of numerical values, e.g., vectors, and are generally of lower dimensionality than the corresponding observations.

The system 100 can generate the embeddings by processing the corresponding observations using an embedding neural network 130. That is, the system 100 processes the current observation 116 using the embedding neural network 130 to generate the embedding 114 of the current observation 116 and processes the goal observation 112 using the embedding neural network 130 to generate the embedding 118 of the goal observation 112.

The embedding neural network 130 can have any appropriate architecture that allows the neural network 130 to map an observation to an embedding. For example, when the observations each include one or more images, the neural network 130 can be a convolutional neural network. In some cases, the embedding neural network 130 can include one subnetwork that processes the current observation and another subnetwork (with the same architecture but possibly different parameter values) that processes the goal observation.

The system 100 processes a policy input that includes (i) the embedding 114 of a current observation 116 characterizing the current state that the environment 104 is in at the given time step and (ii) the embedding 118 of the goal observation 112 characterizing the goal state using the policy neural network 110 to generate a policy output 150 that defines an action 106 to be performed by the robot 102 in response to the current observation 116. Thus, at any given time step, the policy neural network 110 is conditioned not only on the current observation 116 characterizing the current state at the time step but also on the goal observation 112 characterizing the goal state. The policy neural network 110 can therefore also be referred to as a "goal-conditioned policy neural network."

The embedding neural network 130 can have any appropriate architecture that allows the neural network 130 to map two embeddings to a policy output. For example, the policy neural network 110 can be a feedforward neural network, e.g., a multi-layer perceptron (MLP) or a recurrent neural network, that processes a concatenation of the two embeddings to generate the policy output.

The system 100 then uses the policy output 150 to select the action 106 to be performed by the robot 102 in response to the current observation 116.

In one example, the policy output 150 include a respective Q-value for each action in a set of actions. The system 100 can process the Q-values (e.g., using a soft-max function) to generate a respective probability value for each action, which can be used to select the action, or can select the action with the highest Q-value.

The Q value for an action is an estimate of a "return" that would result from the agent performing the action in response to the current observation and thereafter selecting future actions performed by the agent in accordance with current values of the policy neural network parameters.

A return refers to a cumulative measure of "rewards" received by the agent, for example, a time-discounted sum of rewards. As will be described below, during training, the system 100 can generate a respective reward at each time step, where the reward is specified by a scalar numerical value and characterizes, e.g., a progress of the agent towards completing an assigned task.

In another example, the policy output 150 includes a respective numerical probability value for each action in the set of actions. The system 100 can select the action, e.g., by sampling an action in accordance with the probability values for the actions, or by selecting the action with the highest probability value.

As another example, the policy output 150 can be an action vector that specifies commands, e.g., torques, to be applied to various controllable aspects, e.g., joints, of the robot.

As yet another example, in some cases, in order to allow for fine-grained control of the agent, the system 100 may treat the space of actions to be performed by the agent, i.e., the set of possible control inputs, as a continuous space. Such settings are referred to as continuous control settings. In these cases, the policy output 150 of the policy neural network can be the parameters of a multi-variate probability distribution over the space, e.g., the means and covariances of a multi-variate Normal distribution, and the action 106 may be selected as a sample from the multi-variate probability distribution.

Because of the manner in which the system 100 trains the policy neural network 110, the action 106 defined by the policy output 150 is an action that would bring the robot 102 closer to accomplishing the goal (or completing the task) specified by the goal observation 112 represented by the policy input.

In particular, the system 100 includes a training engine 160 that trains the policy neural network 110 and, in some cases, the embedding neural network 130 on training data. In other words, the training engine 160 trains the policy neural network 110 and, optionally, the embedding neural network 130 to determine trained values of model parameters 119 of the policy neural network 110 and, optionally, the embedding neural network 130.

That is, in some implementations, the embedding neural network 130 is pre-trained, e.g., jointly with a different policy neural network or on one or more unsupervised learning tasks, by another system and then the model parameters 119 of the embedding neural network 130 are fixed while the training engine 160 trains the policy neural network 110.

In some other implementations, the training engine 160 trains both the embedding neural network 130 and the policy neural network 110. For example, the system can first train the embedding neural network 130 on an unsupervised objective and then train the policy neural network 110 or train the embedding neural network 130 jointly with the policy neural network 110.

Example techniques for training the embedding neural network 130 are described below with reference to FIG. 2.

Generally, the training engine 160 trains the policy neural network 110 on demonstration data through imitation learning.

The demonstration data includes a plurality of demonstration sequences, with each demonstration sequence including a plurality of demonstration observations characterizing states of an environment while a demonstrating agent interacts with the environment. For example, the demonstration agent can be, e.g., a robot being controlled by a fixed already-learned policy, a robot being controlled by a random policy, a robot being controlled by a user, or a human user that is performing tasks in the environment.

Generally, the observations in at least some of the demonstration sequences are captured from a third-person view of the demonstration agent (typically an image captured by an image generation unit not mounted on the demonstration agent and/or in which at least part of the demonstration unit appears). For example, these observations can each include one or more third-person images of the demonstration agent captured at a corresponding time point while the demonstration agent performs a task.

In some cases, during this training, the training engine 160 controls the real robot 102 (or multiple different instances of the real robot 102) in the real-world environment 104. In some other cases, during this training, the training engine 160 controls a simulated version of the real robot 102 (or multiple different simulated versions of the real robot 102) in a computer simulation of the real-world environment 104. After the policy neural network 110 is trained based on the interactions of the simulated version with the simulated environment, the robot 102 can be deployed in the real-world environment 104, and the trained policy neural network 110 can be used to control the interactions of the robot with the real-world environment. Training the policy neural network 110 based on interactions of the simulated version with a simulated environment (i.e., instead of a real-world environment) can avoid wear-and-tear on the robot and can reduce the likelihood that, by performing poorly chosen actions, the robot can damage itself or aspects of its environment. Moreover, training in simulation can allow a large amount of training data to be generated in a much more time-efficient and resource-efficient manner than when controlling the robot 102 is required to generate the training data.

In the description below, the term "agent" will be used to refer to a simulated version of the robot 102 when training is performed in simulation or an instance of the robot 102 when the training is performed in the real-world environment 104.

Figure 2:
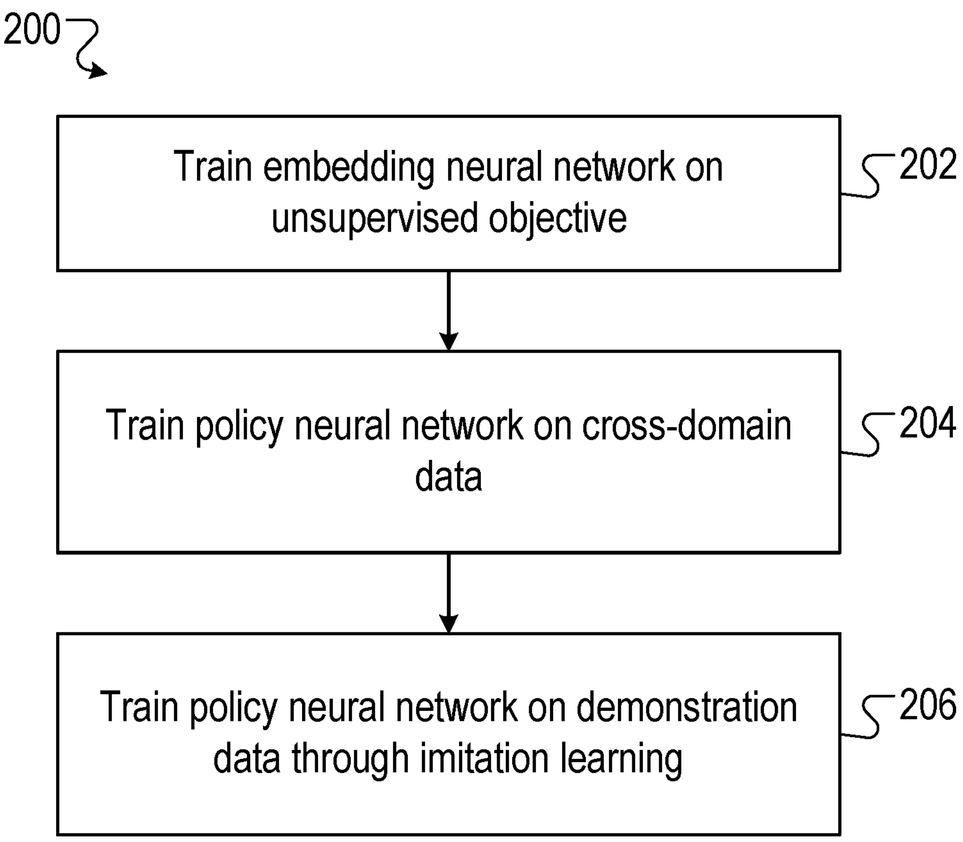
FIG. 2 is a flow diagram of an example process for training a policy neural network and an embedding neural network.

FIG. 2 is a flow diagram of an example process 200 for training an embedding neural network and a policy neural network. For convenience, the process 200 will be described as being performed by a system of one or more computers located in one or more locations. For example, a neural network training system, e.g., the neural network training system 100 of FIG. 1, appropriately programmed, can perform the process 200.

The system trains the embedding neural network on an unsupervised objective (step 202).

Generally, the system can train the embedding neural network on any appropriate unsupervised objective that improves the usefulness of the representations generated by the embedding neural network.

The term "domain" refers to a defined process for generating an observation from the environment at any given time, where the observation depends upon the state of the environment at that time. Many detailed examples of "domains" are given below, but some examples of "domains" include capturing an image of the environment by a certain camera (where different images of the same state of the environment from different cameras are from different domains), perturbing some aspect of the state of the environment before capturing an image of the environment (where different images of the same state but with different perturbations applied are from different domains), and perturbing one or more properties of an image of the environment (where different perturbations applied to the same image of the environment are from different domains). Different "domains" are different respective processes for obtaining an observation from an environment at any given time; for example, multiple domains may consist of capturing images of the environment from different respective cameras. Thus, given an evolution of the state of the environment in a plurality of time steps ("an episode"), the respective domains can be used to produce respective sequences of observations, where each observation in the sequence for a given domain corresponds to a respective one of the time steps and is generated from the state of the environment at the corresponding time step in accordance with the domain. Here the term "evolution" is used to include both an incremental evolution with an increment for each time step, and a continuous evolution which is observed at intervals.

In some cases, the system trains the embedding neural network on an unsupervised objective that makes use of aligned cross-domain sequences. A "cross-domain sequence" means a set of multiple sequences of observations, where each sequence in the set was produced from the same evolution of the environment using a different respective domain. An aligned cross domain sequence is one that includes, at each of a plurality of time steps: a first observation from a first domain characterizing a state of the environment at the time step and a second observation from a second domain characterizing the state of the environment at the time step. Differences between domains and generating cross-domain sequences are described in more detail below with reference to step 204.

The training in step 202 is performed based on a corpus of one or more aligned cross-domain sequences. Each aligned cross-domain sequence of the corpus consists of multiple (e.g. two) sequences of observations obtained using a respective one of multiple (e.g. two) domains (a "first domain" and a "second domain"). Both sequences of observations in each cross-domain sequence are obtained by observing an evolution of the environment at each of a plurality of time steps. In one example, the corpus of aligned cross-domain sequences may be obtained from the "demonstration data," and/or from the "cross-domain data" described below, but alternatively or additionally other cross-domain sequences can be used, e.g. from episodes when a reinforcement learning process was previously carried out in the environment or from episodes in which some agent was acting in the environment according to any appropriate policy.

As a particular example, the objective can train the embedding neural network to generate representations by enforcing higher similarity between temporally-aligned observation pairs from two different domains in a given cross-domain sequence, compared to any other pair from the cross-domain sequence where both the observations are from the same domain.

As one example, the objective can satisfy:

$$\min_{\varphi}\left(-\sum_{i}^{N}\sum_{k}^{N} p_{ik}\log\left(\frac{\exp(x_i^T\overline{x}_k)}{\sum_{j}^{N}\exp(x_i^T\overline{x}_j)}\right)\right) \quad (1)$$

where φ represents the parameters of the embedding neural network, $$p_{ik} = \frac{\exp(-|i-k|)}{\sum_{u}^{N}\exp(-|i-u|)},$$

i, k, j, and u go from 1 to the total number of time steps N in the cross-domain sequence, $x_i$ is the embedding generated by the embedding neural network for the first domain observation at the i-th time step, and $\overline{x}_k$ is the embedding generated by the embedding neural network for the second domain observation at the k-th time step.

The inclusion of the $p_{ik}$ term in the objective encourages the embeddings generated by the embedding neural network to be temporally smooth, i.e., such that temporal neighbors have similar representations, even when they are from different domains. This is because the inclusion of the $p_{ik}$ term in the objective causes the objective to penalize misclassification of temporally distant pairs of embeddings more strongly than temporally adjacent pairs of embeddings.

If there are multiple cross-domain sequences in the corpus used to perform step 202, the embedding neural network may be trained by minimizing with respect to φ an objective which is obtained by summing the expression in the outer brackets of Eqn, (1) over the sequences.

In some implementations, the system also trains the policy neural network and the embedding neural network on cross-domain data to optimize a cross-domain loss (step 204).

Generally, the cross-domain data includes observations from multiple different domains. The cross-domain data describes, for each of one of more episodes in which an agent was controlled to operate in the environment, observations obtained using multiple domains. In the case that there are two domains, these may be termed "first observations" from a "first domain", and "second observations" from a "second domain". The cross-domain data further comprises actions taken based on the first observations.

For some or all of the domains, the observations from that domain may be generated by perturbing the state of the environment before the observation is captured or modifying the observation after the observation is captured so that the observation reflects a perturbed state of the environment. The cross-domain data may be, or be derived from, the "demonstration data" referred to below, but it may alternatively be describing other episodes in which the agent was controlled in the environment.

In particular, the cross-domain data includes a plurality of cross-domain tuples, with each cross-domain tuple including (i) a respective first observation of the environment from a respective first domain characterizing a first state of the environment, (ii) an action performed by the agent in response to the respective first observation, and (iii) a respective second observation of the environment from a respective second domain that is different from the respective first domain and that characterizes a state of the environment that is subsequent to the first state.

Some specific examples of respective first and second domains for any given tuple follow.

In some examples, observations from the first domain for the tuple are generated by applying a first set of one or more perturbations to properties of the environment, properties of images of the environment, or both. Examples of perturbations to properties of the environment can include removing the robot or another object from the environment, i.e., making the robot or other object appear invisible, randomly perturbing physics properties of the robot or other object in the environment, e.g., changing one or more of mass, friction, armature, damping, or gear. Examples of perturbations to the properties of the images of the environment include randomly perturbing intensity values of pixels of the image, randomly rotating the image, randomly skewing the image, randomly blurring the image, and so on.

In some examples, observations from the second domain for the tuple are generated by applying a second set of one or more perturbations to properties of the environment, properties of images of the environment, or both.

More specifically, observations from the first domain can be generated by applying the first set of perturbations, and observations from the second domain can be generated by applying the second set of perturbations. In these cases, the first set of perturbations includes a different set of perturbations than the second set.

Alternatively, observations from the first domain can be generated without applying any perturbations to properties of the environment or properties of images in the environment while observations from the second domain are generated by applying the second set of perturbations to properties of the environment, properties of images of the environment, or both.

Alternatively, observations from the second domain can be generated without applying any perturbations to properties of the environment or properties of images in the environment while observations from the first domain are generated by applying a first set of perturbations to properties of the environment, properties of images of the environment, or both.

To generate a given cross-domain tuple, the system can obtain an aligned cross-domain sequence that includes, at each of a plurality of time steps: a first observation from the first domain characterizing a state of the environment at the time step; data identifying a corresponding action performed by an agent at the time step; and a second observation from the second domain characterizing the state of the environment at a later time step.

To generate a given cross-domain sequence, the system can either apply the corresponding perturbations to each state of the environment in a sequence from a "canonical" environment that is un-perturbed or cause the agent to, starting from the same state in both the first and second domain, perform the same action at the same time in both the first and second domains.

The system then selects, as the first observation in the tuple, one of the first observations in the aligned cross-domain sequence, e.g., the initial observation from the first domain in the sequence.

The system then selects, as the second observation in the tuple, a second observation that is at a time step that is after the time step of the selected first observation in the aligned cross-domain sequence. For example, the system can select the observation randomly from the second observations that are at time steps that are after the time step of the selected first observation in the aligned cross-domain sequence. The random selection may be a random sample from a probability distribution over the second observations, such as one which gives all the second observations an equal probability.

Once the tuples have been generated, the system trains the policy neural network to minimize the cross-domain loss for the generated tuples.

In particular, the cross-domain loss measures, for each cross-domain tuple, an error between (i) an action specified by a policy output generated by the policy neural network by processing a policy input that includes (a) an embedding of the respective first observation in the tuple and (b) an embedding of the respective second observation in the tuple, i.e., a policy input that treats the respective second observation in the tuple as the goal observation, and (ii) the action performed by the agent in response to the respective first observation in the tuple. For example, the error can be the squared Euclidean loss between the two actions.

The system can also train the embedding neural network on this error by backpropagating the gradient of the loss through the policy neural network and into the embedding neural network.

Thus, this cross-domain loss encourages the policy neural network and embedding neural network to generate policy outputs that accurately reflect the actions that were actually taken in the cross-domain sequences even though the two observations in the policy input to the policy neural network are from different domains.

In some implementations, rather than performing step 202 and then performing step 204, the system performs step 202 and 204 concurrently. That is, the system trains the embedding neural network and the policy neural network on a combined objective that includes both the unsupervised objective and the cross-domain loss.

By training the embedding neural network using steps 204 and 206, the system can train the embedding neural network to generate "manipulator-independent" representations, i.e., that capture the relevant aspects of the state of the environment that are needed to effectively control an agent independent of the properties of the "manipulator," i.e., the agent that is interacting with and manipulating objects in the environment in a given observation.

After performing step 204, in some implementations, the system re-initializes the values of the parameters of the policy neural network before performing step 206. In some other implementations, the system performs step 206 starting from the values of the parameters of the policy neural network determined after step 204.

The system trains the policy neural network through imitation learning using a set of demonstration data (step 206).

In some implementations, while performing step 206, the system keeps the values of the embedding neural network fixed to the values determined by performing only step 202, by performing both step 202 and step 204, or to the trained values that were determined by the another system.

In some other implementations, while performing step 206, the system also trains the embedding neural network by backpropagating gradients through the policy neural network and into the embedding neural network.

The demonstration data includes a plurality of demonstration sequences, with each demonstration sequence including a plurality of demonstration observations characterizing states of an environment while a demonstrating agent interacts with the environment. For example, the demonstration agent can be, e.g., a robot being controlled by a fixed already-learned policy, a robot being controlled by a random policy, a robot being controlled by a user, or a human user that is performing tasks in the environment.

As will be described in more detail below, during this training, the system uses the demonstration observations in the demonstration sequences to generate goal observations that are used to condition the policy neural network.

Figure 3:
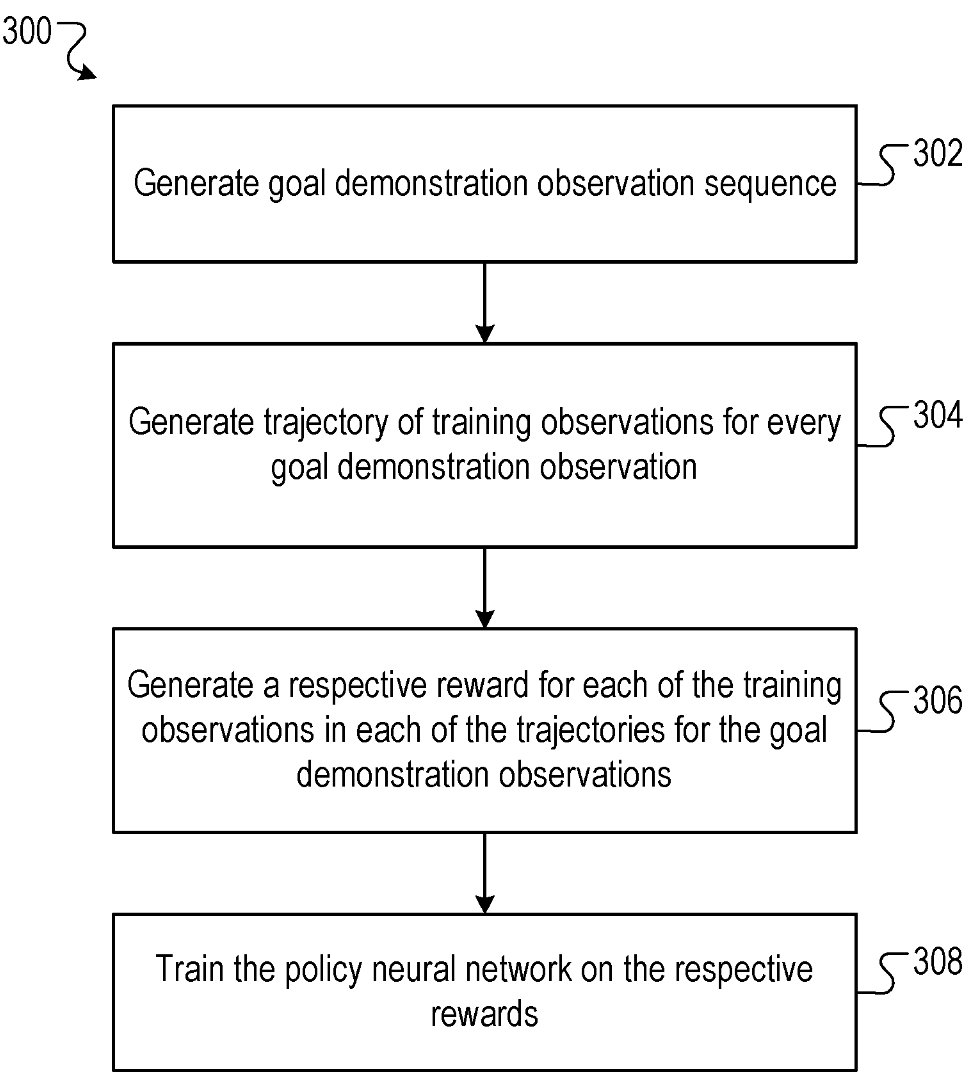
FIG. 3 is a flow diagram of an example process for training the policy neural network on a demonstration sequence.

FIG. 3 is a flow diagram of an example process 300 for training the policy neural network using a demonstration sequence. For convenience, the process 300 will be described as being performed by a system of one or more computers located in one or more locations. For example, a neural network training system, e.g., the neural network training system 100 of FIG. 1, appropriately programmed, can perform the process 300.

The system can repeatedly perform the process 300 for different demonstration sequences sampled from the demonstration data to update the parameters of the policy neural network.

In some cases, while training the policy neural network on the demonstration sequences by performing iterations of the process 300, the system holds the values of the parameters of the embedding neural network fixed, i.e., to the values that were determined after steps 202, 204, or both were performed. In some other cases, the system backpropagates gradients through the policy neural network and into the embedding neural network to train the embedding neural network jointly with the policy neural network.

The system generates a sequence of goal demonstration observations from the demonstration sequence (step 302). In particular, the system selects, as goal demonstration observations, a proper subset of the demonstration observations in the demonstration sequence. That is, the goal demonstration sequence includes less than all of the demonstration observations in the demonstration sequence. For example, the system can uniformly sample, as goal demonstration observations, every Nth demonstration observation in the sequence, where Nis greater than one, e.g., five or ten.

The system then performs steps 304 and 306 for every goal demonstration observation in the goal demonstration sequence, starting from the first goal demonstration in the sequence of goal demonstrations and continuing until the last goal demonstration in the sequence of goal demonstrations, i.e., by traversing the goal demonstration sequence starting from the first goal demonstration through the last goal demonstration.

The system generates a trajectory of training observations for the goal demonstration observation (step 304).

In particular, to generate the trajectory, the system controls the agent using policy outputs generated by the policy neural network while the policy neural network is conditioned on policy inputs that each include an embedding of the goal demonstration observation. That is, at each time step in the trajectory, the policy neural network processes a policy input that includes (i) an embedding of an observation ("training observation") characterizing the state of the environment at the time step and (ii) the embedding of the goal demonstration observation.

More specifically, the system controls the agent while the policy neural network is conditioned on policy inputs that each include an embedding of the goal demonstration observation only until a training observation is received for which the similarity between the embedding of the training observation and the embedding of the goal demonstration observation satisfies a first criterion.

For example, the first criterion can specify that a dense reward computed from the similarity between the embedding of the training observation and the embedding of the goal demonstration observation as described below for the training observation exceeds a first threshold value. Here the term "dense reward" is a term conventional in this field, and refers to a reward which is not "sparse." A sparse reward refers to one that is non-zero only for at most a small number, e.g., one or two, observations in a trajectory. A dense reward, on the other hand, can be non-zero for a large number of the observations in a given trajectory and the difference between dense rewards for different observations indicates which of the training observations is closer to reaching the goal.

That is, once a training observation is received for which the similarity between the embedding of the training observation and the embedding of the goal demonstration observation satisfies the first criterion, the system terminates the trajectory and that received training observation becomes the last observation in the trajectory.

For the first goal demonstration observation in the goal demonstration sequence, the system starts generating the trajectory from an initial state of the environment, e.g., from a predetermined initial state, from a randomly selected state, or from a state that corresponds to the state characterized by the first observation in the demonstration sequence, i.e., so that the first observation characterizes the initial state. Each training observation in the trajectory except the first is an observation of the state of the environment at a corresponding time step, after the robot has performed an action which is generated in the preceding time step based on the policy output generated by the policy neural network from policy input for the preceding time step.

For each subsequent goal demonstration observation in the goal demonstration sequence, the system starts generating the trajectory from the last state of the environment at the completion of the trajectory for the preceding goal demonstration observation in the goal demonstration sequence, i.e., so that the first observation in the trajectory characterizes the last state of the environment at the completion of the trajectory for the preceding goal demonstration. Each training observation in the trajectory except the first is an observation of the state of the environment at a corresponding time step, after the robot has performed an action which is generated in the preceding time step based on the policy output generated by the policy neural network from policy input for the preceding time step.

In some implementations, if the agent has performed a threshold number of actions within a trajectory and no training observation has received for which the similarity between the embedding of the training observation and the embedding of the goal demonstration observation satisfies a first criterion, the system can terminate the episode, e.g., and refrain from using any of the trajectories generated thus far for training, refrain from using only the most recent trajectory that caused the episode to be terminated, or assign a 0 reward to the training observations in the most recent trajectory that caused the episode to be terminated.

The system generates a respective reward for each of the training observations in the trajectory for the goal demonstration observation based on the similarity between the embedding of the training observation and the embedding of the goal demonstration observation (step 306).

In some cases, the rewards are dense rewards, i.e., rewards that are non-zero for many of the training observations in any given trajectory.

In these cases, the system can generate the reward for a given training observation by applying a normalization factor to the similarity between, e.g., the Euclidean distance between, the cosine similarity between, or any other appropriate similarity measure between, the embedding of the given training observation and the embedding of the goal demonstration observation to generate a normalized similarity and then computing a dense reward from the normalized similarity.

As a particular example, the system can compute the normalization factor based on differences between embeddings of adjacent (consecutive) demonstration observations in the demonstration sequence. In some cases, the system computes the normalization factor as the mean of the element-wise Euclidean distances between the embeddings of adjacent demonstration observations in the demonstration sequence.

Generally, the system can compute the dense reward using any function of the normalized similarity that assigns larger reward values when the normalized similarity indicates that the embeddings are more similar and smaller reward values when the normalized similarity indicates that the embeddings are relatively less similar.

As a particular example, when the similarity is the Euclidean distance, the dense reward r for a training observation o can satisfy:

$$r=e^{-\omega\|\varphi(o)-\varphi(\bar{g})\|2},$$

where $\omega$ is the normalization factor, $\varphi(o)$ is the embedding of the training observation o, and $\varphi(\bar{g})$ is the embedding of the goal observation $\bar{g}$.

In some other cases, the rewards are sparse rewards, i.e., rewards that are non-zero for only a small fraction of the training observations in any given trajectory.

In these cases, the system can generate the reward for a given training observation by determining whether the dense reward for the given training observation exceeds a second threshold value. The system can then set the sparse reward to be equal to one if the dense reward for the given training observation satisfies the second threshold and set the sparse reward to be equal to zero if the dense reward does not satisfy the second threshold value. The first and second threshold values can be pre-determined or determined through a hyper-parameter sweep and can be the same value or different values. Setting the first threshold value equal to the second threshold value results in at most one training observation in any given trajectory having a non-zero reward value.

The system trains the policy neural network on the respective rewards for the training observations in the trajectories for all of the goal demonstration observations in the goal demonstration sequence through reinforcement learning (step 308).

The system can train the policy neural network on the respective rewards using any appropriate reinforcement learning technique, e.g., an actor-critic reinforcement learning technique, a policy-gradient based technique, and so on.

In some cases, the system performs the process 300 for each demonstration sequence in a batch of multiple demonstration sequences and then uses the reinforcement learning technique to update the parameters of the policy neural network based on the rewards for all of the trajectories generated for all of the demonstration sequences in the batch.

Figure 4:
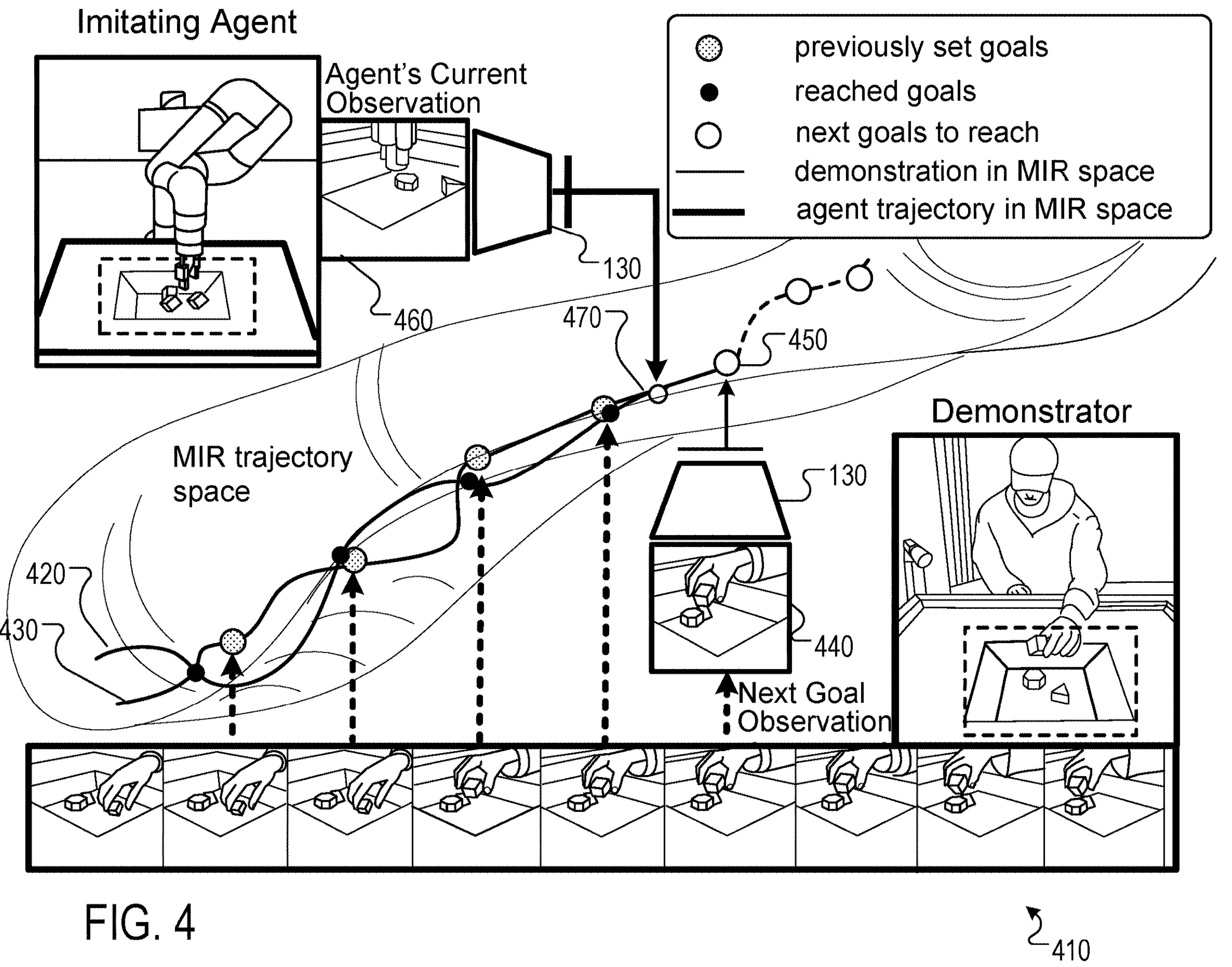
FIG. 4 illustrates the training of the policy neural network using a demonstration sequence.

FIG. 4 illustrates the generation of a trajectory for use in training the policy neural network on an example demonstration observation sequence.

In particular, as shown in FIG. 4, the system has generated a goal demonstration sequence 410 from the demonstration sequence and is in the process of controlling the agent to generate respective trajectories 420 for each of the goal demonstrations in the goal demonstration sequence 410 as described above.

In particular, the example of FIG. 4 shows the trajectories 420 and an original trajectory 430 defined by the demonstration sequence as respective paths through an "MIR trajectory space," i.e., the embedding space of the embeddings generated by the embedding neural network.

As shown in FIG. 4, the system is currently generating the trajectory for a goal demonstration observation 440 and therefore, at each time step during generating the trajectory, has conditioned the policy neural network 110 on, as the embedding of the current goal, an embedding 470 of the goal demonstration observation 440 that is generated by the embedding neural network 130.

At the current time state, the system also provides as input to the policy neural network 110 an embedding 450 generated by the embedding neural network 130 of the current observation 460 of the current state of the environment at the time step as captured by a camera sensor of the agent.

As can be seen from the example of FIG. 4, the goal demonstration observations in the goal demonstration observation sequence 410 are images captured from a third-person view of the "demonstrator," i.e., the demonstration agent, while the current observation 460 is captured from a first-person, ego-centric view of the environment relative to the agent.

Thus, at each time step, the policy neural network 110 receives as input (i) an embedding of a first-person observation and (ii) an embedding of a third-person observation of a different agent. Nonetheless, by using the techniques described in this specification, the policy neural network 110 can be effectively trained on such data.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more computers and for training a goal-conditioned policy neural network to control a robot, the method comprising:

obtaining demonstration data comprising a plurality of demonstration sequences, each demonstration sequence comprising a plurality of demonstration observations characterizing states of an environment while a demonstrating agent interacts with the environment; and training a goal-conditioned policy neural network on the demonstration data through reinforcement learning, wherein the goal-conditioned policy neural network is configured to:

receive a policy input comprising an embedding of a current observation characterizing a current state of the environment and an embedding of a goal observation characterizing a goal state of the environment, and process the policy input in accordance with the policy parameters to generate a policy output that defines an action to be performed by an agent in response to the current observation, and wherein the training comprises, for each of the plurality of demonstration sequences:

generating a sequence of goal demonstration observations by selecting, as goal demonstration observations, a proper subset of the demonstration observations in the demonstration sequence;

for each goal demonstration observation, starting from the first goal demonstration in the sequence of goal demonstrations and continuing until the last goal demonstration in the sequence of goal demonstrations:

generating, starting from a respective starting state, a trajectory of training observations for the goal demonstration observation by controlling, only until a training observation is received for which the similarity between the embedding of the training observation and the embedding of the goal demonstration observation satisfies a first criterion, the agent using policy outputs generated by the goal-conditioned policy neural network while the goal-conditioned policy neural network is conditioned on policy inputs that each include an embedding of the goal demonstration observation, wherein:

the respective starting state for the first goal demonstration is an initial state of the environment, and the respective starting state for each subsequent goal demonstration is a last state of the environment characterized by the training observation in the trajectory for the preceding goal demonstration observation for which the similarity between the embedding of the training observation and the embedding of the goal demonstration observation satisfies the first criterion' and generating a respective reward for each of the training observations based on a similarity between an embedding of the training observation and the embedding of the goal demonstration observation; and training the goal-conditioned policy neural network on the respective rewards for the training observations in the trajectories through reinforcement learning.

2. The method of claim 1, wherein the goal demonstration observations include images taken from a third-person perspective of the demonstration agent interacting with the environment.

3. The method of claim 1, wherein the rewards are not based on any data identifying actions performed by the demonstration agent while interacting with the environment.

4. The method of claim 1, wherein generating a respective reward for each of the training observations based on a similarity between an embedding of the training observation and the embedding of the goal demonstration observation comprises:

applying a normalization factor to the similarity to generate a normalized similarity; and computing a dense reward from the normalized similarity.

5. The method of claim 4, wherein the normalization factor is based on differences between embeddings of adjacent demonstration observations in the demonstration sequence.

6. The method of claim 4 wherein generating a respective reward comprises:

generating a sparse reward that is equal to one if the dense reward satisfies a second threshold value and is equal to zero if the dense reward does not satisfy the second threshold value.

7. The method of claim 1, further comprising:

prior to training the goal-conditioned policy neural network on the demonstration data, training the goal-conditioned policy neural network on cross-domain data that includes a plurality of cross-domain tuples, each cross-domain tuple comprising:

(i) a respective first observation of the environment from a respective first domain characterizing a first state of the environment, (ii) an action performed by the agent in response to the respective first observation, and (iii) a respective second observation of the environment from a respective second domain that is different from the respective first domain and that characterizes a state of the environment that is subsequent to the first state.

8. The method of claim 7, wherein training the goal-conditioned policy neural network on the cross-domain data comprises:

training the goal-conditioned policy neural network to minimize a cross-domain loss that measures, for each cross-domain tuple, an error between (i) an action specified by a policy output generated by the goal-conditioned policy neural network by processing a policy input that includes (a) an embedding of the respective first observation in the tuple and (b) an embedding of the respective second observation in the tuple and (ii) the action performed by the agent in response to the respective first observation in the tuple.

9. The method of claim 7, further comprising:

generating the plurality of cross-domain tuples, comprising, for each cross-domain tuple:

obtaining an aligned cross-domain sequence, the cross-domain sequence comprising, at each of a plurality of time steps:

a first observation from the first domain characterizing a state of the environment at the time step, data identifying a corresponding action performed by the agent at the time step; and a second observation from the second domain characterizing the state of the environment at the time step;

selecting, as the first observation in the tuple, one of the first observations in the aligned cross-domain sequence; and selecting, as the second observation in the tuple, a second observation that is at a time step that is after the time step of the selected first observation in the aligned cross-domain sequence.

10. The method of claim 9, wherein selecting, as the second observation in the tuple, a second observation that is at a time step that is after the time step of the selected first observation in the aligned cross-domain sequence comprises:

selecting the observation randomly from the second observations that are at time steps that are after the time step of the selected first observation in the aligned cross-domain sequence.

11. The method of claim 7, wherein observations from the first domain are generated by applying a first set of perturbations to properties of the environment, properties of images of the environment, or both.

12. The method of claim 7, wherein observations from the second domain are generated by applying a second set of perturbations to properties of the environment, properties of images of the environment, or both.

13. The method of claim 7, wherein observations from the first domain are generated without applying any perturbations to properties of the environment or properties of images in the environment and observations from the second domain are generated by applying a second set of perturbations to properties of the environment, properties of images of the environment, or both.

14. The method of claim 7, wherein observations from the second domain are generated without applying any perturbations to properties of the environment or properties of images in the environment and observations from the first domain are generated by applying a first set of perturbations to properties of the environment, properties of images of the environment, or both.

15. The method of claim 1, wherein embeddings of observations of the environment in the policy input are generated by processing the observations using an embedding neural network.

16. The method of claim 15, further comprising training the embedding neural network using unsupervised learning on aligned sequence pairs that each include temporally-aligned sequences of observations from two different domains.

17. The method of claim 15, when also dependent on claim 7, wherein training the goal-conditioned policy neural network on cross-domain data comprises backpropagating gradients through the goal-conditioned policy neural network into the embedding neural network to train the embedding neural network on the cross-domain data.

18. One or more non-transitory computer-readable storage media encoded with instructions that, when executed by one or more computers, cause the one or more computers to perform operations comprising:

obtaining demonstration data comprising a plurality of demonstration sequences, each demonstration sequence comprising a plurality of demonstration observations characterizing states of an environment while a demonstrating agent interacts with the environment; and training a goal-conditioned policy neural network on the demonstration data through reinforcement learning, wherein the goal-conditioned policy neural network is configured to:

receive a policy input comprising an embedding of a current observation characterizing a current state of the environment and an embedding of a goal observation characterizing a goal state of the environment, and process the policy input in accordance with the policy parameters to generate a policy output that defines an action to be performed by the robot in response to the current observation, and wherein the training comprises, for each of the plurality of demonstration sequences:

generating a sequence of goal demonstration observations by selecting, as goal demonstration observations, a proper subset of the demonstration observations in the demonstration sequence;

for each goal demonstration observation, starting from the first goal demonstration in the sequence of goal demonstrations and continuing until the last goal demonstration in the sequence of goal demonstrations:

generating, starting from a respective starting state, a trajectory of training observations for the goal demonstration observation by controlling, only until a training observation is received for which the similarity between the embedding of the training observation and the embedding of the goal demonstration observation satisfies a first criterion, the agent using policy outputs generated by the goal-conditioned policy neural network while the goal-conditioned policy neural network is conditioned on policy inputs that each include an embedding of the goal demonstration observation, wherein:

the respective starting state for the first goal demonstration is an initial state of the environment, and the respective starting state for each subsequent goal demonstration is a last state of the environment characterized by the training observation in the trajectory for the preceding goal demonstration observation for which the similarity between the embedding of the training observation and the embedding of the goal demonstration observation satisfies the first criterion; and generating a respective reward for each of the training observations based on a similarity between an embedding of the training observation and the embedding of the goal demonstration observation; and training the goal-conditioned policy neural network on the respective rewards for the training observations in the trajectories through reinforcement learning.

19. A system comprising one or more computers and one or more storage devices storing instructions that, when executed by the one or more computers, cause the one or more computers to perform operations comprising:

obtaining demonstration data comprising a plurality of demonstration sequences, each demonstration sequence comprising a plurality of demonstration observations characterizing states of an environment while a demonstrating agent interacts with the environment; and training a goal-conditioned policy neural network on the demonstration data through reinforcement learning, wherein the goal-conditioned policy neural network is configured to:

receive a policy input comprising an embedding of a current observation characterizing a current state of the environment and an embedding of a goal observation characterizing a goal state of the environment, and process the policy input in accordance with the policy parameters to generate a policy output that defines an action to be performed by the robot in response to the current observation, and wherein the training comprises, for each of the plurality of demonstration sequences:

generating a sequence of goal demonstration observations by selecting, as goal demonstration observations, a proper subset of the demonstration observations in the demonstration sequence;

for each goal demonstration observation, starting from the first goal demonstration in the sequence of goal demonstrations and continuing until the last goal demonstration in the sequence of goal demonstrations:

generating, starting from a respective starting state, a trajectory of training observations for the goal demonstration observation by controlling, only until a training observation is received for which the similarity between the embedding of the training observation and the embedding of the goal demonstration observation satisfies a first criterion, the agent using policy outputs generated by the goal-conditioned policy neural network while the goal-conditioned policy neural network is conditioned on policy inputs that each include an embedding of the goal demonstration observation, wherein:

the respective starting state for the first goal demonstration is an initial state of the environment, and the respective starting state for each subsequent goal demonstration is a last state of the environment characterized by the training observation in the trajectory for the preceding goal demonstration observation for which the similarity between the embedding of the training observation and the embedding of the goal demonstration observation satisfies the first criterion; and generating a respective reward for each of the training observations based on a similarity between an embedding of the training observation and the embedding of the goal demonstration observation; and training the goal-conditioned policy neural network on the respective rewards for the training observations in the trajectories through reinforcement learning.

20. The system of claim 19, wherein the goal demonstration observations include images taken from a third-person perspective of the demonstration agent interacting with the environment.

* * * * *